United States Patent

[11] 3,616,234

| [72] | Inventors | Kazuo Komagata<br>Tokyo;<br>Takashi Nakase, Kanagawa-ken; Koji Mitsugi, Kanagawa-ken; Shinji Okumura, Kanagawa-ken, all of Japan |
|---|---|---|
| [21] | Appl. No. | 849,137 |
| [22] | Filed | Aug. 11, 1969 |
| [45] | Patented | Oct. 26, 1971 |
| [73] | Assignee | Ajinomoto Co., Inc.<br>Tokyo, Japan |
| [32] | Priority | June 5, 1965 |
| [33] | | Japan |
| [31] | | 40/33273 |
| | | Continuation-in-part of application Ser. No. 554,996, June 3, 1966, now abandoned. |

[54] METHOD OF PREPARING PROTEASE FROM CANDIDA LIPOLYTICA
7 Claims, No Drawings

[52] U.S. Cl. .................................................. 195/66 R, 195/29

[51] Int. Cl. .................................................. C12d 13/10
[50] Field of Search .................................. 195/62, 66, 29

[56] References Cited
UNITED STATES PATENTS

| 3,127,327 | 3/1964 | Nomoto et al. | 195/62 |
| 3,186,922 | 6/1965 | Champagnat et al. | 195/82 |
| 3,345,269 | 10/1967 | Von Hofsten | 195/66 |

*Primary Examiner*—Lionel M. Shapiro
*Attorney*—Kurt Kelman

ABSTRACT: Candida lipolytica produces a protease intracellularly and particularly in a culture medium on which the micro-organism is grown. The enzyme may be recovered from the medium by conventional methods or the cell free medium may be contacted with the protein to be hydrolyzed. Alternatively, the protein may be contacted with live cells of the micro-organism in an aqueous medium.

METHOD OF PREPARING PROTEASE FROM CANDIDA LIPOLYTICA

REFERENCE TO RELATED APPLICATION

This is a continuation-in-part of our application Ser. No. 554,996, filed June 3, 1966, now abandoned.

This invention relates to a novel protease and to a method of preparing the same.

We have found that certain types of yeast can produce large amounts of protease extracellularly in a culture medium. Protease is useful in medicine, in the food industry, in certain cosmetics and in the hydrolysis of proteins to amino acids and peptides.

It is known that proteases are produced by micro-organisms, especially by bacteria, streptomycetes, and certain fungi and some of these micro-organisms have been used for the commercial production of protease. However, only intracellular protease was obtained heretofore from yeast.

The present invention is based on the finding that *Candida lipolytica*, a yeast, produces protease of high activity abundantly in a culture broth on which it is cultivated.

Representative strains of *Candida lipolytica* which may be used in this invention are Y-5-8 (ATCC No. 16617), YF-186 (ATCC No. 16618), Y-8-3, K-9, K-28, K-43, M-6-1, and Y-6-4, which were isolated by us from cheese, from pears, and from deposits on neutralizing tanks used in the manufacture of glutamic acid. They were identified according to the classification method described in "The Yeast" by J. Lodder, published in 1952. The isolation of some of these strains was reported by us in J. Gen. Appl. Microbiol., vol. 10, p. 323 (1964).

The original strain of *Candida lipolytica* which also can be used in the present invention was isolated from margarine by Jacobsen, and the microbiological characteristics of the strain were described on page 550-552 in "The Yeast," cited above. All strains form pseudo- and truemycelium, do not assimilate sugars except glucose, and possess high activity for hydrolyzing fat. Some strains assimilate galactose as well as glucose. All strains of *Candida lipolytica* form the protease of the invention in the medium on which they grow.

*Candida lipolytica* is readily cultured in a liquid medium which contains an assimilable carbon source as glucose, starch hydrolyzate, organic acids, or hydrocarbons, an organic or inorganic nitrogen source such as ammonium sulfate, urea, or ammonium phosphate; complex organic nutrients which are known to promote growth, such as corn steep liquor, yeast extract, hydrolyzate of soybean protein, casamino acids, meat extract and vitamins; and inorganic salts. The cultivation is preferably carried out at 15°-35° C., and the amount of protease in the culture broth usually reaches a maximum after 10-72 hours. Aerobic cultivation is preferred for better growth of the yeast and high production of protease. It is necessary to limit the culturing time, because the protease activity in the culture broth tends to decrease during excessive culturing. A portion of the protease is present in the yeast cells but the major part is present in the culture broth as extracellular enzyme.

The enzyme in the filtered broth or the supernatant liquid obtained after cell removal by centrifuging can be concentrated or precipitated by known methods such as salting out by the addition of ammonium sulfate, chromatography, filtering through a gel. This enzyme possesses protease activity in a pH range from 2 to 10. The optimum pH is about 8.5-9 when the activity is tested against casein as the substrate.

The protease is very active between 20° and 50° C., with maximum activity at about 30° C., and it loses its activity when heated to 60° C. At temperatures lower than 20° C., enzyme activity is slow. The protease is stable and does not lose its activity after storage for 10 days, at 0°-5° C., in a pH range from 3 to 9.

Under optimum conditions, the protease of the present invention can hydrolyze 70-90 percent of an added protein to a product free of protein nitrogen and soluble in trichloroacetic acid. The yeast protease of the invention is superior in its activity to known protease preparations derived from streptomycetes, fungi, or bacteria. Its optimum action is at a higher pH value than that of the known preparations. However, protein is not usually hydrolyzed completely to free amino acids by the protease of the invention, and about 50 percent of the nonprotein compounds produced are peptides of low-molecular weight.

The protease of the invention readily hydrolyzes the proteins of milk casein and gelatin, wheat gluten, maize gluten, soybean protein, globulin, albumin etc., to compounds soluble in trichloro acetic acid and containing nonprotein nitrogen only.

The protease may be reacted with protein after being separated from the culture medium in which it was produced, but it is also possible to inoculate a liquid medium containing the protein to be hydrolyzed with *Candida lipolytica*. The culture broth containing yeast cells, a cellfree filtrate of the broth, or a crude enzyme preparation obtained by salting out of the filtrate may be used as protease sources. The culture broth of *Candida lipolytica* and the enzyme materials obtained therefrom do not have a disagreeable odor or taste and can be used in the manufacture of food. A pure enzyme can readily be prepared from the culture broth.

The yeast cells may be used as food or animal feed, or as a raw material for manufacturing 5'-ribonucleosides as flavoring agents.

The following examples further illustrate this invention, and it will be understood that the invention is not limited to the examples.

EXAMPLE 1

Fifty ml. batches of an aqueous medium of pH 7.0 containing 5 percent glucose, 1 percent yeast extract, 0.3 percent potassium dihydrogen phosphate, 0.04 percent magnesium sulfate, and 2 p.p.m. each of $Fe^{++}$ and $Mn^{++}$ were placed in shaking flasks of 500 ml. capacity and sterilized for 10 minutes at 115° C. They were then inoculated with *Candida lipolytica* Y-5-8 (ATCC No. 16617) and shaken for 18 hrs. at 25° C. The cells were removed by centrifuging and 684 g. ammonium sulfate were gradually added to each liter of the liquid which was then stored overnight at 5° C. The protease in the liquid precipitated and was collected by centrifuging at 10,000 g. for 15 minutes. It was dissolved in 500 ml. of an M/5.Tris–M/10. HCl buffer solution (pH 8.0).

The solution was dialyzed against running water until free from sulfate ion. The liquid, crude enzyme preparation, contained 916 mg. protein in 625 ml. for a recovery yield of 38.3 percent.

Fifty ml. batches of a 1 percent solution or suspension of a medicinal grade of casein ("Hammerstein casein") in a Tris-HCl buffer of pH 8.0 were each mixed with an amount of the crude protease preparation corresponding to 10 mg. protein. The rate of hydrolysis of the casein was determined from time to time by the following method:

Five ml. of a 0.44 M solution of trichloracetic acid were added to a 6 ml. sample, and the mixture was filtered after standing 30 minutes at 30° C. The nonprotein nitrogen in the filtrate was determined by Folin's method, and the hydrolyzed protein was calculated therefrom.

A one-milliliter sample of the filtrate was mixed with 0.3 ml. of 0.6 N sulfuric acid containing 10 percent sodium tungstate. The precipitate formed was filtered off, and the nitrogen in the filtrate was determined by Folin's method as a measure of the low-molecular peptides and amino acids produced by enzymatic reaction. The results obtained are listed below:

| Enzymatic reaction time, hours | Casein Hydrolyzed, % | Fraction soluble in tungstic acid |
| --- | --- | --- |
| 2 | 70 | 20 |
| 5 | 89 | 33 |
| 9 | 91 | 38 |

| | | |
|---|---|---|
| 16 | 90 | 39 |
| 24 | 90 | 39 |

After 24 hours, the liquid collected by centrifuging each 25 ml. batch of enzymatic reaction mixture was passed through a 3 cm. ×100 cm. column packed with Sephadex G-25, a chromatographic adsorption medium, and was eluted with water at the rate of 10 ml. per 7 minutes. The eluate was collected in successive batches of 10 ml. which were combined into fractions according to their ultraviolet absorption at 280 m$\mu$. Total nitrogen and amino nitrogen were determined for each fraction, and the amino nitrogen after hydrolysis in 6 N aqueous HCl at 115° C. for 22 hours was also determined. The results are listed below.

| Fraction | Batch number | Total nitrogen (%) | Amino nitrogen | |
|---|---|---|---|---|
| | | | before | after hydrolysis |
| I | 15–24 | 5.11 | 1.26 | 3.64 |
| II | 25–30 | 9.60 | 1.88 | 7.35 |
| III | 31–43 | 14.30 | 3.64 | 11.00 |
| IV | 44–55 | 15.08 | 11.12 | 12.40 |

Fraction IV contained only free amino acids and fractions I–III contained the peptides of low-molecular weight.

EXAMPLE 2

*Candida lipolytic* YF-186 (ATCC No. 16618) was cultured as described in example 1, and a cellfree culture broth was prepared by centrifuging.

A suspension of 1 g. milk casein in 50 ml. of an M/5.Tris-M/10.HCl buffer solution (pH 9.0) was mixed with 17 ml. of the broth, and the volume was adjusted to 100 ml. The mixture was incubated at 30° C. for 6 hours, whereby 81.2 percent of the protein was hydrolyzed to compounds free of protein nitrogen.

EXAMPLE 3

As described in example 1, *Candida lipolytica* K–43 was inoculated on an aqueous medium of pH 7.0 containing 5 percent glucose, 0.3 percent potassium dihydrogen phosphate, 0.04 percent magnesium sulfate, 1 percent casamino acid, 50 gram percent Vitamin $B_1$, 2 p.p.m. each of $Fe^{++}$, $Mn^{++}$, and cultured with shaking. The broth was filtered at 25° C. for 20 hours, and 17 ml. of the filtrate were added to 50 ml. Tris–HCl buffer solution (pH 8.0) containing milk casein. The volume was adjusted to 100 ml. and the fermentation mixture was incubated at 30° C. for 5 hours, whereby 63 percent of the milk casein was hydrolyzed to nitrogen-bearing nonprotein compounds.

EXAMPLE 4

Fifty ml. batches of a liquid medium of pH 6.8 containing 5 percent glucose, 0.2 percent yeast extract, 0.2 ml./dl soybean protein hydrolyzate, 0.3 percent ammonium chloride, 1.2 percent urea, 0.3 percent potassium dihydrogen phosphate, and 0.04 percent magnesium sulfate were placed in shaking flasks of 500 ml. capacity. After sterilization for 10 minutes at 115° C., the flasks were inoculated with *Candida lipolytica* Y–5–8 (ATCC No. 16617) which had been cultured at 25° C. for 24 hours on agar slants containing 0.3 percent malt extract, 0.3 percent yeast extract, 1 percent glucose, and 0.5 percent polypeptone. Fermentation was carried out for 40 hours with shaking at 25° C. The weight of the cells produced in the culture broth was 0.96 g./dl on a dry basis.

The cells were collected intact from the culture broth by centrifuging at 12,000 g. for 10 minutes, and suspended in 90 ml. of a solution containing 0.02 percent potassium chloride. Eighty ml. of the cell suspension were added to 250 ml. of a phosphate buffer solution (pH 8.0) containing 4 g. milk casein, and the volume was adjusted to 400 ml. The fermentation mixture was stored at 30° C. for 9 hours. The yield of nonprotein compounds containing nitrogen was determined as in example 1, and 47 percent of the milk casein was found to be hydrolyzed.

When 80 ml. of the cellfree culture broth were added to the casein instead of the cells, 72 percent of the protein was hydrolyzed under the conditions described in the preceding examples.

EXAMPLE 5

0.5 g. wheat gluten, 0.45 g. maize protein, and 1.05 g. soybean cake were respectively suspended in 50 ml. batches of a buffer solution containing 0.2 M Tris and 0.1 M HCl (pH 9). 16.5 ml. of the crude enzyme solution prepared in example 1 were added to each batch, and the volume was then adjusted to 100 ml. Enzymatic reaction was permitted to proceed for 24 hours at 30° C. The enzymatic reaction mixtures were analyzed with the following results:

| | Hydrolyzed Protein, % | Soluble in Tungstic Acid % |
|---|---|---|
| Wheat gluten | 77.3 | 67 |
| Maize protein | 81.6 | 64 |
| Soybean cake | 73.0 | 65 |

While the invention has been described with particular reference to specific embodiments, it is to be understood that it is not limited thereto.

What we claim is:

1. A method of preparing protease which comprises cultivating *Candida lipolytica* in a liquid aqueous medium under aerobic conditions until the medium has extracellular protease activity; and recovering protease from said medium.

2. A method as set forth in claim 1, wherein said medium includes sources of assimilable carbon and assimilable nitrogen, and growth promoting complex organic nutrients, and said *Candida lipolytic* is cultivated for 10 to 72 hours at 15° to 35° C. in said medium.

3. A method as set forth in claim 1, which further comprises separating the cells of said *Candida lipolytica* from said medium when the medium has protease activity.

4. A method as set forth in claim 1, wherein said *Candida lipolytica* is of the strains *Candida lipolytica* Y–5–8 (ATCC No. 16617) or YF-186 (ATCC No. 16618).

5. A method of hydrolyzing a protein which comprises contacting aid protein in a liquid aqueous medium at pH 2 to 10 and at a temperature lower than 60° C. with living cells of *Candida lipolytica*.

6. A method as set forth in claim 5, wherein said temperature is at least 20° C.

7. A method of hydrolyzing a protein which comprises cultivating *Candida lipolytica* in a liquid aqueous medium under aerobic conditions until the medium has extracellular protease activity, separating the cells from the medium, and contacting the cellfree medium with said protein at a temperature between 20° and 60° C.

* * * * *